United States Patent
Hosokawa et al.

(10) Patent No.: US 11,860,442 B2
(45) Date of Patent: Jan. 2, 2024

(54) OPTICAL DRIVING DEVICE

(71) Applicant: TDK CORPORATION, Tokyo (JP)

(72) Inventors: Masahiro Hosokawa, Tokyo (JP); Naoki Yusa, Tokyo (JP)

(73) Assignee: TDK CORPORATION, Tokyo (JP)

(*) Notice: Subject to any disclaimer, the term of this patent is extended or adjusted under 35 U.S.C. 154(b) by 329 days.

(21) Appl. No.: 17/472,279

(22) Filed: Sep. 10, 2021

(65) Prior Publication Data

US 2022/0082901 A1    Mar. 17, 2022

(30) Foreign Application Priority Data

Sep. 11, 2020  (JP) .................................. 2020-152701

(51) Int. Cl.
  *G02B 7/08*  (2021.01)
  *G03B 3/10*  (2021.01)

(52) U.S. Cl.
  CPC .................. *G02B 7/08* (2013.01); *G03B 3/10* (2013.01)

(58) Field of Classification Search
  None
  See application file for complete search history.

(56) References Cited

U.S. PATENT DOCUMENTS

| | | | |
|---|---|---|---|
| 10,247,955 B2* | 4/2019 | Hosokawa | G03B 13/36 |
| 10,409,029 B2* | 9/2019 | Hosokawa | G02B 7/026 |
| 2011/0141584 A1* | 6/2011 | Henderson | G02B 7/022 |
| | | | 359/896 |
| 2012/0026611 A1* | 2/2012 | Hu | H02K 41/0356 |
| | | | 359/824 |
| 2013/0016962 A1* | 1/2013 | Wu | H04N 23/57 |
| | | | 396/133 |
| 2020/0393637 A1* | 12/2020 | Ryoo | H02N 2/142 |
| 2021/0255417 A1* | 8/2021 | Hosokawa | G03B 3/10 |

FOREIGN PATENT DOCUMENTS

| | | | |
|---|---|---|---|
| JP | 2020-013063 A | | 1/2020 |
| JP | 2021124662 A | * | 8/2021 |
| JP | 2021124663 A | * | 8/2021 |
| JP | 2021125632 A | * | 8/2021 |
| WO | WO-2014162721 A1 | * | 10/2014 ............... G02B 7/08 |

* cited by examiner

*Primary Examiner* — Clayton E. LaBalle
*Assistant Examiner* — Diana Hancock
(74) *Attorney, Agent, or Firm* — Oliff PLC

(57) ABSTRACT

An optical driving device includes: a movable portion to which an optical element is attachable; a drive portion which movably holds the movable portion; and a fixing portion which holds the drive portion, in which each end portion of a first shaft provided in the drive portion and slidably holding the movable portion and each end portion of a second shaft provided separately from the drive portion and slidably supporting the movable portion are fixed to the fixing portion. A diameter of the first shaft is larger than a diameter of the second shaft and a distance between fixing positions of the fixing portion to which each end portion of the first shaft is fixed is smaller than a distance between fixing positions of the fixing portion to which each end portion of the second shaft is fixed.

11 Claims, 11 Drawing Sheets

OPTICAL DRIVING DEVICE

BACKGROUND OF THE INVENTION

1. Field of the Invention

The present invention relates to an optical driving device.

2. Description of the Related Art

In recent years, various inventions relating to an optical driving device using a smooth impact drive mechanism (SIDM) (registered trademark) provided with a piezoelectric element as an actuator have been proposed.

For example, JP 2020-13063 A describes a lens driving device including a lens frame to which a lens is attachable, an actuator movably holding the lens frame, and a base member holding the actuator. The actuator is provided with a piezoelectric element and a drive shaft connected to an end portion of the piezoelectric element and an upper end portion of the drive shaft is fixed to a cover covering the lens frame. By transmitting the expansion and contraction of the piezoelectric element to the drive shaft, the lens frame engaging with the drive shaft with a predetermined frictional force can be moved by using a speed difference between the expansion and contraction of the piezoelectric element.

However, in the lens driving device described in JP 2020-13063 A, since a large amount of vibration generated by the expansion and contraction of the piezoelectric element is transmitted not only to the drive shaft but also to a housing (cover or the like), the operation of the lens frame may be hindered and the reliability of the lens driving device may be reduced.

SUMMARY OF THE INVENTION

The present invention has been made in view of such circumstances and an object thereof is to provide a highly reliable optical driving device.

In order to achieve the above-described object, an optical driving device according to the present invention includes: a movable portion, an optical element being attachable to the movable portion; a drive portion movably holding the movable portion; and a fixing portion holding the drive portion, in which each end portion of a first shaft and each portion of a second shaft are fixed to the fixing portion, the first shaft being provided in the drive portion and slidably holding the movable portion, the second shaft provided separately from the drive portion and slidably supporting the movable portion, a diameter of the first shaft is larger than a diameter of the second shaft, and a distance between fixing positions of the fixing portion, fixing positions fixing both end portions of the first shaft is smaller than a distance between fixing positions of the fixing portion, fixing positions fixing both end portions of the second shaft.

In the optical driving device according to the present invention, each end portion of the first shaft provided in the drive portion and slidably holding the movable portion and each end portion of the second shaft provided separately from the drive portion and slidably supporting the movable portion are fixed to the fixing portion. Therefore, the support structure of the fixing portion is reinforced by two shafts of the first shaft and the second shaft and the structural strength of the assembly of the fixing portion and these two shafts is increased. Thus, the resistance of the fixing portion against the load (vibration or the like) can be increased, the fixing portion can be effectively protected from the vibration generated in the drive portion, and the malfunction of the movable portion caused by the vibration of the fixing portion can be prevented. Further, since the movable portion is slidably held (or supported) through two shafts, the movable portion can be stably driven by the drive portion.

Further, in the optical driving device according to the present invention, the diameter of the first shaft is larger than the diameter of the second shaft and the distance between the fixing positions of the fixing portion, the fixing positions fixing both end portions of the first shaft is smaller than the distance between the fixing positions of the fixing portion, the fixing positions fixing both end portions of the second shaft. Therefore, the structural strength of the assembly of the fixing portion and two shafts can be remarkably increased and the resistance of the first shaft against the own weight or the weight of the movable portion can be increased. Thus, the first shaft can be effectively protected from breakage or bending and the positional accuracy of the movable portion can be improved.

As described above, according to the present invention, the highly reliable optical driving device can be realized.

Preferably, the drive portion includes a piezoelectric element connected to a end portion of the first shaft and the diameter of the first shaft is larger than a diameter of the piezoelectric element. With such a configuration, the first shaft has a relatively large diameter and the movable portion can be engaged with the first shaft with an appropriate frictional force. Thus, the movable portion can be driven with high accuracy in accordance with the movement of the first shaft that moves in the moving direction in accordance with the expansion and contraction of the piezoelectric element.

Preferably, a end portion of the second shaft is provided with a taper surface. With such a configuration, for example, when the end portion of the second shaft is fixed to the fixing portion by using a joining member such as an adhesive, a sufficient joint area between the joining member and the end portion of the second shaft can be ensured and the end portion of the second shaft can be firmly fixed to the fixing portion.

Preferably, a length of a holding region of the movable portion held by the first shaft is longer than a length of a support region of the movable portion supported by the second shaft. With such a configuration, the holding region of the movable portion can be engaged with the first shaft with an appropriate frictional force and the movable portion can be driven with high accuracy.

Preferably, the support region is located inside both ends of the holding region when viewed from a direction perpendicular to a moving direction of the drive portion. With such a configuration, the movable portion can be held (or supported) in a well-balanced manner by two shafts of the first shaft and the second shaft and the movable portion can be driven with high accuracy.

Preferably, the fixing portion includes a first fixing portion, a second fixing portion supported by the first fixing portion, and a third fixing portion supported by the first fixing portion or the second fixing portion. Particularly, since the fixing portion is divided into the first fixing portion and the second fixing portion, the first fixing portion can be combined with the second fixing portion, for example, while the drive portion is combined with the second fixing portion at the time of assembling the drive portion and the fixing portion. In this case, the drive portion can be easily disposed inside the fixing portion (between the first fixing portion and the second fixing portion) and the assembly of the drive portion and the fixing portion is facilitated.

Preferably, one end portion of the first shaft is fixed to the third fixing portion and the other end portion of the first shaft is fixed to the second fixing portion. In this case, since the first shaft serves as a column for supporting the third fixing portion by the second fixing portion and the column does not need to be provided in the third fixing portion, the configuration of the third fixing portion can be simplified. Further, the first shaft functions as a part of the fixing portion and the third fixing portion can be fixed to the second fixing portion with a sufficient strength through the first shaft.

Preferably, one end portion of the second shaft is fixed to the third fixing portion and the other end portion of the second shaft is fixed to the first fixing portion. In this case, since the second shaft serves as a column for supporting the third fixing portion by the first fixing portion and the column does not need to be provided in the third fixing portion, the configuration of the third fixing portion can be simplified. Further, the third fixing portion can be fixed to the first fixing portion with a sufficient strength through the second shaft.

DETAILED DESCRIPTION OF THE PREFERRED EMBODIMENTS

Hereinafter, an embodiment of the present invention will be described with reference to the drawings.

Figure 1:
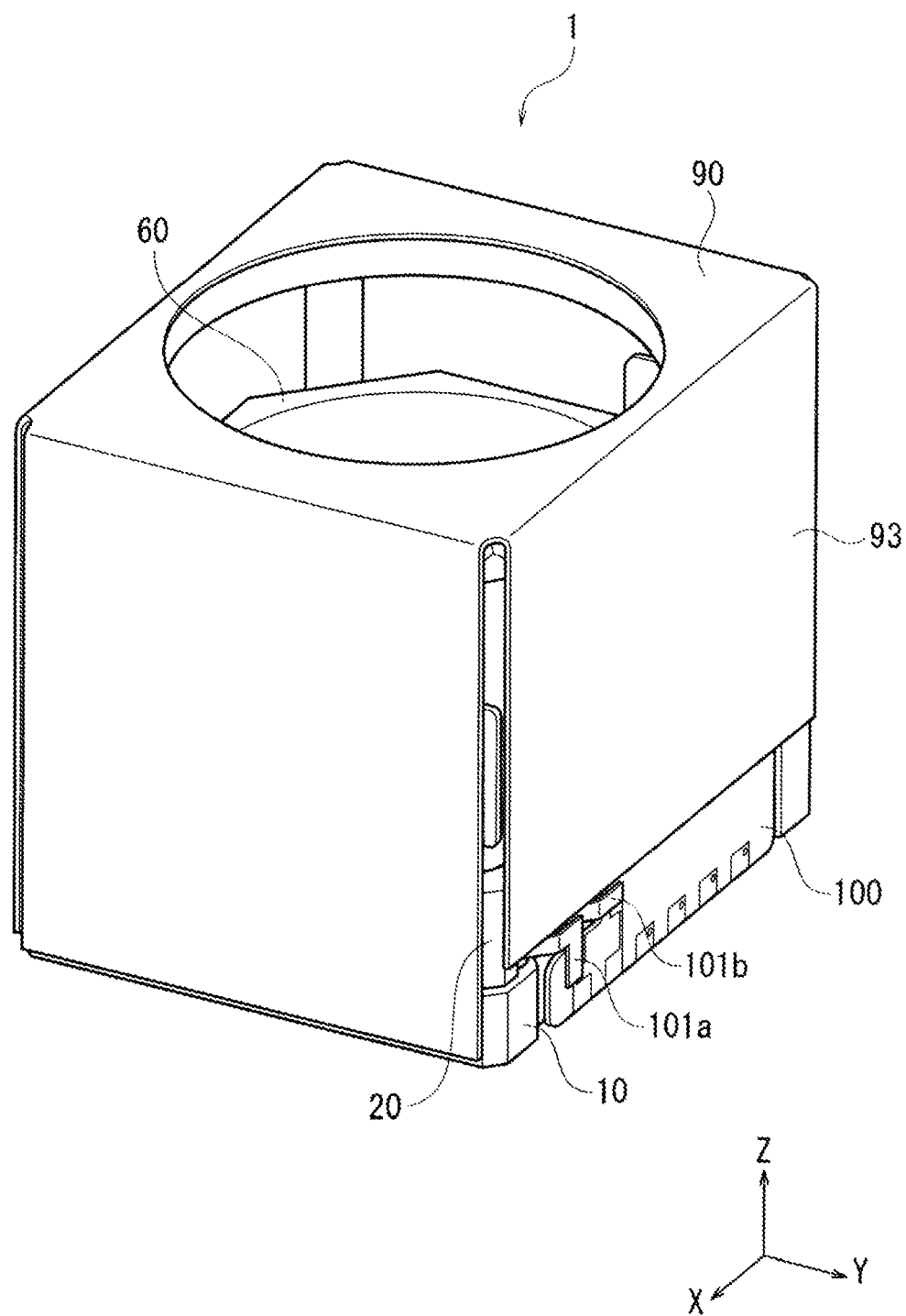
FIG. 1 is a schematic perspective view showing an optical driving device according to an embodiment of the present invention.
Figure 2:
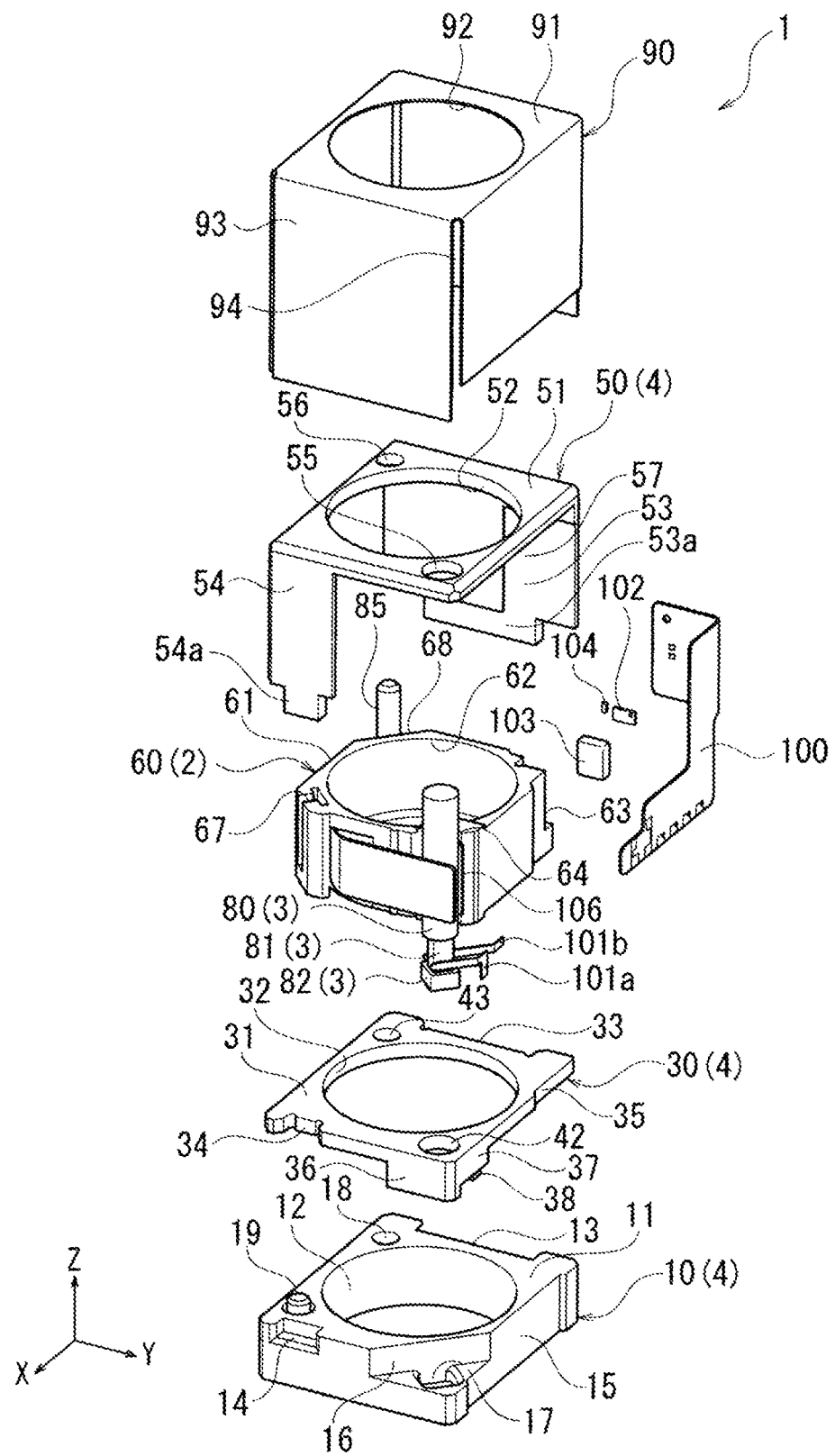
FIG. 2 is an exploded perspective view of the optical driving device shown in FIG. 1.

As shown in FIG. 1, an optical driving device 1 according to an embodiment of the present invention is mounted on a terminal device such as a mobile phone and can be driven by a smooth impact drive mechanism (SIDM) (registered trademark) actuator. The optical driving device 1 has an outer shape formed as a substantially square columnar shape and includes a movable portion 2, a drive portion 3, and a fixing portion 4 as shown in FIG. 2. The fixing portion 4 is divided into a first fixing portion 10, a second fixing portion 30, and a third fixing portion 50 and the detailed structure thereof will be described later in detail.

The drive portion 3 is configured as a piezoelectric actuator and movably holds the movable portion 2 (optical element holding portion 60). The drive portion 3 includes a piezoelectric element 80, a first shaft 81, and an inertial member 82.

The drive portion 3 transmits the expansion and contraction of the piezoelectric element 80 to the first shaft 81 and moves the movable portion 2 engaging with the first shaft 81 with a predetermined frictional force using a speed difference between expansion and contraction of the piezoelectric element 80. Additionally, the moving direction (moving direction) of the movable portion 2 is the Z-axis direction and corresponds to the axial direction of the first shaft 81. When a lens is provided in the optical element holding portion 60 as an optical element, the moving direction of the movable portion 2 is the optical axis direction of the lens.

Figure 8A:
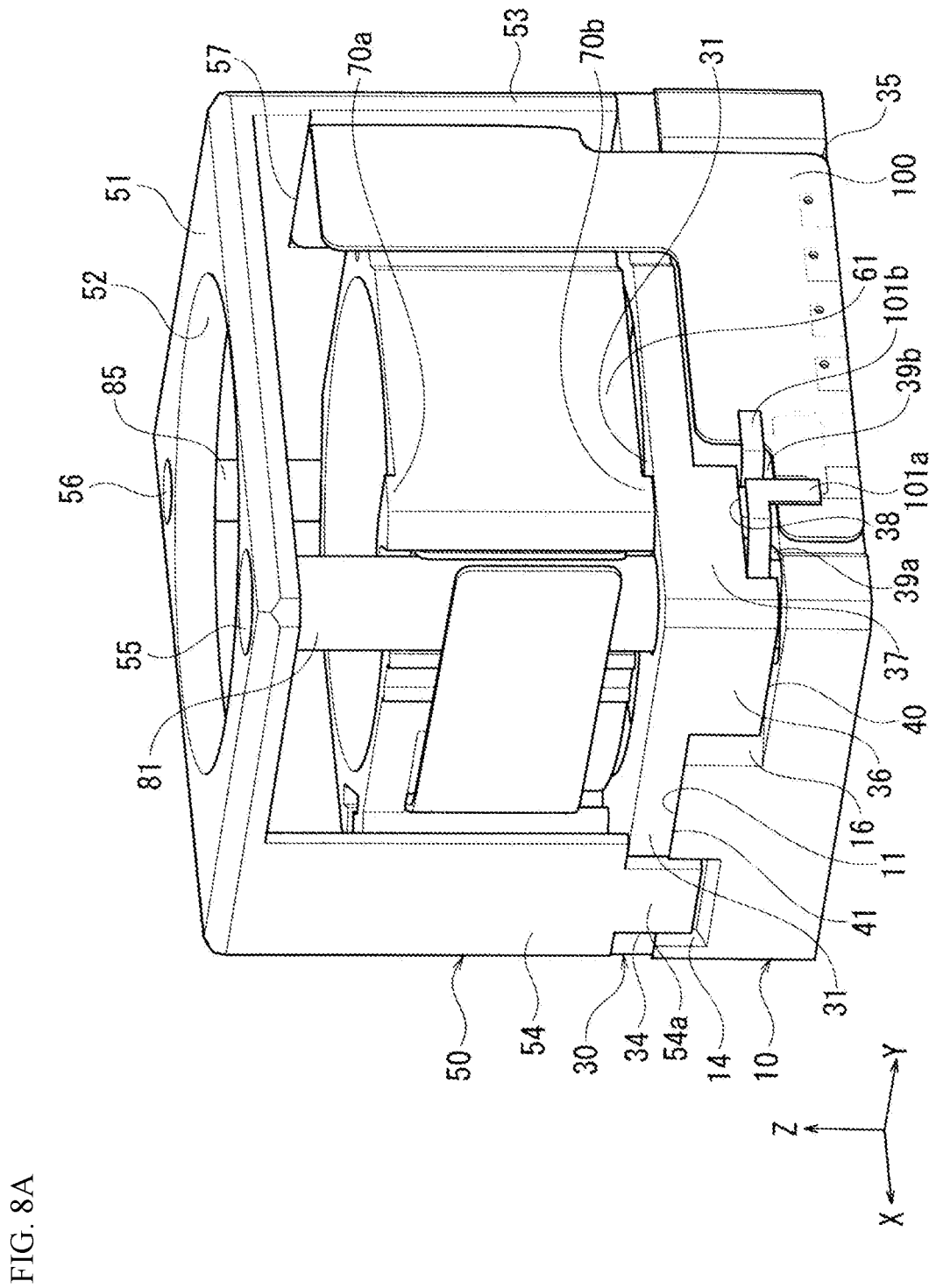
FIG. 8A is a perspective view when the cover is removed from the optical driving device shown in FIG. 1.

The piezoelectric element 80 is formed in a prismatic shape and a plurality of dielectric layers and internal electrode layers are alternately laminated therein in the Z-axis direction. The piezoelectric element 80 is disposed on the second fixing portion 30. External electrodes (not shown) are respectively formed on the opposite side surfaces of the piezoelectric element 80 and the internal electrode layers are electrically connected to the respective external electrodes. One end of each of a pair of lead frames 101a and 101b is fixed to each external electrode and the other end of each of the pair of lead frames 101a and 101b is connected to a circuit board 100 (FIG. 8A). An electric signal (rectangular wave) is given from the circuit board 100 to the piezoelectric element 80 via the lead frames 101a and 101b, so that the piezoelectric element 80 can move to expand and contract in the Z-axis direction. Additionally, the circuit board 100 made of flexible printed circuits (FPC).

The first shaft 81 is connected to the upper end portion of the piezoelectric element 80. The method of fixing the first shaft 81 and the piezoelectric element 80 is not particularly limited, but both can be joined to each other with, for example, a resin. The material of the first shaft 81 is not particularly limited, but for example, metal, carbon, resin, or the like can be adopted. This point also applies to a second shaft 85 to be described later. The first shaft 81 is formed in a columnar shape and reciprocates due to expansion and contraction of the piezoelectric element 80. The first shaft 81 slidably holds the movable portion 2, the lower end portion thereof is fixed to the second fixing portion 30, and the upper end portion thereof is fixed to the third fixing portion 50. The diameter of the first shaft 81 is larger than the diameter of the second shaft 85. Further, the cross-sectional area of the surface of the first shaft 81 cut in the direction perpendicular to the longitudinal direction is larger than the cross-sectional area of the surface cut in the same direction of the second shaft 85.

The optical element holding portion 60 constituting the movable portion 2 is frictionally engaged with the outer peripheral surface of the first shaft 81. The diameter of the first shaft 81 is larger than the diameter of the piezoelectric element 80 (the length of one side or the length of the long side) and the surface area of the end surface of the first shaft 81 is larger than the surface area of the end surface of the piezoelectric element 80. In the example shown in the drawings, the shape of the first shaft 81 is a columnar shape, but the shape is not particularly limited and may be a polygonal columnar shape.

The inertial member 82 is formed in a prismatic shape and is connected to the lower end portion of the piezoelectric element 80. The inertial member 82 is disposed on the first fixing portion 10 and the position of the connection portion between the piezoelectric element 80 and the inertial member 82 substantially coincides with the position of the boundary portion between the first fixing portion 10 and the second fixing portion 30. The inertial member 82 has a function as an inertial body for applying an inertial force to the first shaft 81 and is for generating a displacement due to expansion and contraction of the piezoelectric element 80 only toward the first shaft 81. The inertial member 82 is made of, for example, a weight, and is made of a material having a higher specific gravity than the piezoelectric element 80 and the first shaft 81. The material of the inertial member 82 is not particularly limited, but for example, a metal having a large specific gravity such as tungsten or an alloy containing such a metal can be adopted. The method of fixing the inertial member 82 and the piezoelectric element 80 is not particularly limited, but both can be joined to each other with, for example, a resin.

The second shaft 85 is formed in a columnar shape and slidably supports the movable portion 2. The lower end portion of the second shaft 85 is fixed to the first fixing portion 10 and the upper end portion of the second shaft 85 is fixed to the third fixing portion 50. Additionally, although the first shaft 81 and the second shaft 85 are provided in the optical driving device 1 of this embodiment, the second shaft 85 is formed separately from the drive portion 3 and mainly functions as the fixing portion 4. Further, the second shaft 85 plays a role of regulating the rotation of the movable portion 2 (optical element holding portion 60) as will be described later.

Figure 3A:
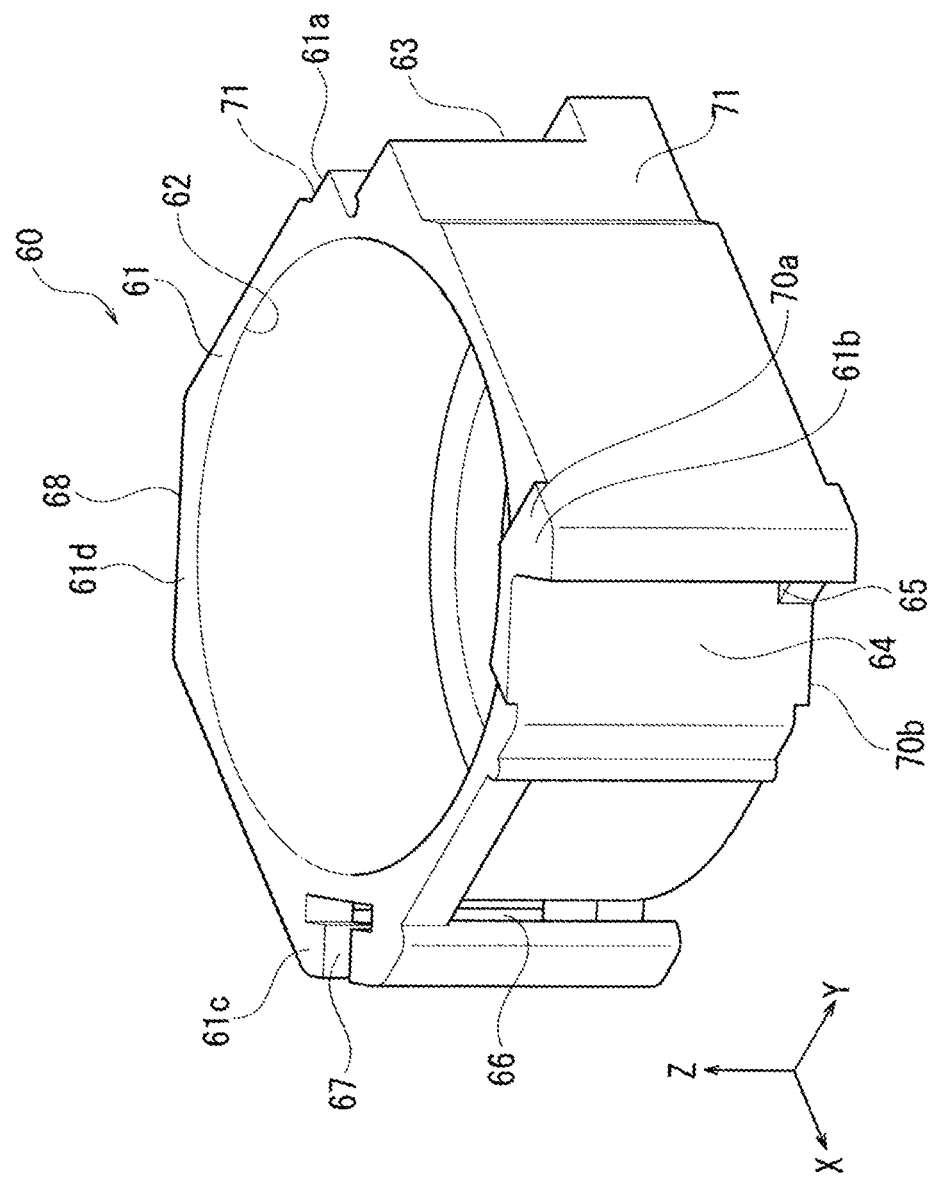
FIG. 3A is a perspective view of an optical element holding portion shown in FIG. 2.

The movable portion 2 is formed as the optical element holding portion 60 and is formed such that an optical element (not shown) such as an optical lens, an optical prism, or a reflecting mirror can be attached. As shown in FIG. 3A, the optical element holding portion 60 includes a main body portion 61. The main body portion 61 is formed in a cylindrical shape and the central portion thereof is provided with an element installation opening portion 62. The optical element can be provided on the inner surface of the element installation opening portion 62. Hereinafter, for convenience of description, four corner portions provided in the main body portion 61 will be referred to as a first corner portion 61a to a fourth corner portion 61d, respectively.

The first corner portion 61a of the main body portion 61 is provided with a magnetic body installation step portion 63. The magnetic body installation step portion 63 is formed with a predetermined length in the Z-axis direction from the upper surface of the main body portion 61. A sensor magnet 103 shown in FIG. 2 can be installed on the step surface of the magnetic body installation step portion 63 in the manner shown in FIG. 7. The sensor magnet 103 is adhesively fixed to the magnetic body installation step portion 63 with, for example, an adhesive or the like. The width in the X-axis direction and the width in the Y-axis direction of the magnetic body installation step portion 63 are substantially equal to the width in the X-axis direction and the width in the Y-axis direction of the sensor magnet 103, respectively, and the step height of the magnetic body installation step portion 63 is higher than the height of the sensor magnet 103.

Figure 7:
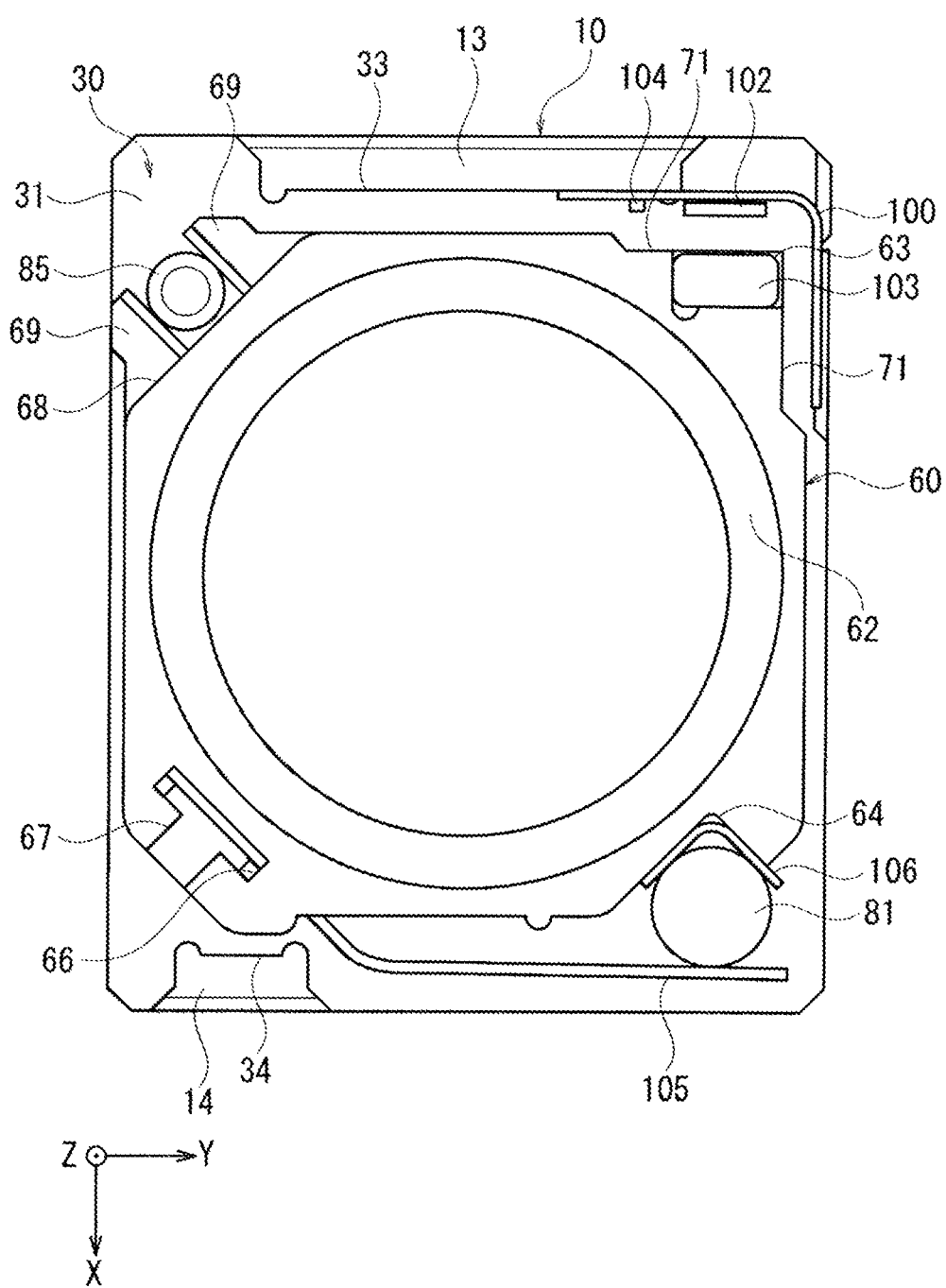
FIG. 7 is a plan view when a cover and the third fixing portion are removed from the optical driving device shown in FIG. 1.

Here, the sensor magnet 103 will be described. As shown in FIG. 7, the sensor magnet 103 is disposed to face a position sensor 102 fixed to the circuit board 100 in the X-axis direction. The position sensor 102 is installed to detect the magnetic field emitted from the sensor magnet 103.

When the optical element holding portion 60 moves in a reciprocating manner in the Z-axis direction, the position of the sensor magnet 103 in the Z-axis direction changes. At this time, the strength of the magnetic field detected by the position sensor 102 changes according to the position of the sensor magnet 103 in the Z-axis direction. Here, the position of the sensor magnet 103 in the Z-axis direction, that is, the position of the optical element holding portion 60 in the Z-axis direction can be detected by analyzing a change in the strength of the magnetic field emitted from the sensor magnet 103. Additionally, a noise canceling capacitor 104 is provided at a position adjacent to the sensor magnet 103 in the circuit board 100.

As shown in FIG. 3A, the first corner portion 61a of the main body portion 61 is provided with a substrate facing step surface 71. The substrate facing step surface 71 is formed in a step shape and is formed to straddle the side portion located between the first corner portion 61a and the second corner portion 61b of the main body portion 61 and the side portion located between the first corner portion 61a and the fourth corner portion 61d. The substrate facing step surface 71 is formed to prevent the contact between each of the side portions of the main body portion 61 and the circuit board 100 and is disposed to face the circuit board 100 as shown in FIG. 7.

As shown in FIG. 3A, stoppers 70a and 70b are formed in the second corner portion 61b of the main body portion 61. The stopper 70a is formed to straddle the side portion located between the first corner portion 61a and the second corner portion 61b of the main body portion 61 and the side portion located between the second corner portion 61b and the third corner portion 61c. The stopper 70a protrudes upward from the upper surface of the main body portion 61 and forms a step therearound. The stopper 70a is for restricting the upward movement of the optical element holding portion 60 and the optical element holding portion 60 is movable upward until the stopper 70a comes into contact with the lower surface of the third fixing portion 50 (or a position near the lower surface) (see FIG. 8A).

Similarly, the protrusion portion 70b is formed to straddle the side portion located between the first corner portion 61a and the second corner portion 61b of the main body portion 61 and the side portion between the second corner portion 61b and the third corner portion 61c. The protrusion portion 70b protrudes downward from the lower surface of the main body portion 61 and forms a step therearound. The stopper 70b is for restricting the downward movement of the optical element holding portion 60 and the optical element holding portion 60 is movable downward until the stopper 70b comes into contact with the upper surface of the second fixing portion 30 (or a position near the upper surface) (see FIG. 8A).

The second corner portion 61b of the main body portion 61 is provided with a shaft sliding groove portion 64. The shaft sliding groove portion 64 is formed from the upper surface to the lower surface of the main body portion 61 and is recessed toward the central portion of the main body portion 61. As shown in FIG. 7, the shaft sliding groove portion 64 has a shape bent in a substantially perpendicular direction when viewed from above. An engagement portion 106 can be disposed inside the shaft sliding groove portion 64. Additionally, the engagement portion 106 will be described in detail later.

As shown in FIG. 3A, the lower end portion of the shaft sliding groove portion 64 is provided with a pedestal 65. The pedestal 65 has a predetermined length in the Z-axis direction and the lower surface thereof is flush with the lower surface of the main body portion 61. The engagement portion 106 can be disposed on the pedestal 65.

The engagement portion 106 is formed as an elastic member and has a predetermined length in the Z-axis direction. As shown in FIG. 7, the engagement portion 106 is bent in a substantially L shape when viewed from above. The engagement portion 106 is formed by bending a metal plate material having a flat plate shape at about 90° by machining. The shape of the engagement portion 106 corresponds to the groove shape of the shaft sliding groove portion 64 and the engagement portion 106 can be engaged with the inside of the shaft sliding groove portion 64. The method of fixing the engagement portion 106 and the shaft sliding groove portion 64 is not particularly limited, but both can be joined to each other with, for example, a resin. The engagement portion 106 comes into contact with the outer peripheral surface of the first shaft 81 and sandwiches the first shaft 81 between a portion on one side and a portion on the other side of the bent portion.

As shown in FIGS. 2 and 7, a pressing member 105 is formed as an elastic member, for example, a leaf spring. One end portion of the pressing member 105 is fixed to a pressing member installation hole 66 to be described later by, for example, an epoxy-based resin and the other end portion comes into contact with the outer peripheral surface of the first shaft 81. A part of the pressing member 105 is bent, so that the pressing member 105 can be disposed along the side portion of the main body portion 61 from the second corner portion 61b to the third corner portion 61c of the main body portion 61. The other end portion of the pressing member 105 presses the outer peripheral surface of the first shaft 81 by an elastic force.

When viewed from above, the engagement portion 106 and the pressing member 105 come into contact with the outer peripheral surface of the first shaft 81 at three points and are sandwiched by these members. At this time, a frictional force corresponding to the pressing force of the pressing member 105 is applied to each contact point of the first shaft 81 with respect to the pressing member 105 and the engagement portion 106. Accordingly, the optical element holding portion 60 can be frictionally engaged with the first shaft 81 through the engagement portion 106 and the pressing member 105 so that the movable portion 2 (optical element holding portion 60) is held by the drive portion 3 (first shaft 81). In this way, the first shaft 81 holds (supports) the optical element holding portion 60 at the position sandwiched between the pressing member 105 and the engagement portion 106.

As shown in FIGS. 3A and 7, the pressing member installation hole 66 is formed in the third corner portion 61c of the main body portion 61. The pressing member installation hole 66 is formed to penetrate the side portion located between the second corner portion 61b and the third corner portion 61c of the main body portion 61 and the side portion located between the third corner portion 61c and the fourth corner portion 61d. The width in the Z-axis direction of the pressing member installation hole 66 is substantially equal to or larger than the width in the Z-axis direction of the pressing member 105 and the other end portion of the pressing member 105 is inserted thereinto. Accordingly, the pressing member 105 can be fixed to the optical element holding portion 60.

A T-shaped notch 67 is formed in the third corner portion 61c of the main body portion 61. The T-shaped notch 67 has a T shape when viewed from above and extends downward from the upper surface of the main body portion 61. The T-shaped notch 67 is connected to the pressing member installation hole 66 therein. When fixing the pressing member 105 to the pressing member installation hole 66, a resin can be injected from the T-shaped notch 67 and the pressing member 105 can be adhesively fixed to the pressing member installation hole 66 by the resin.

Figure 3B:
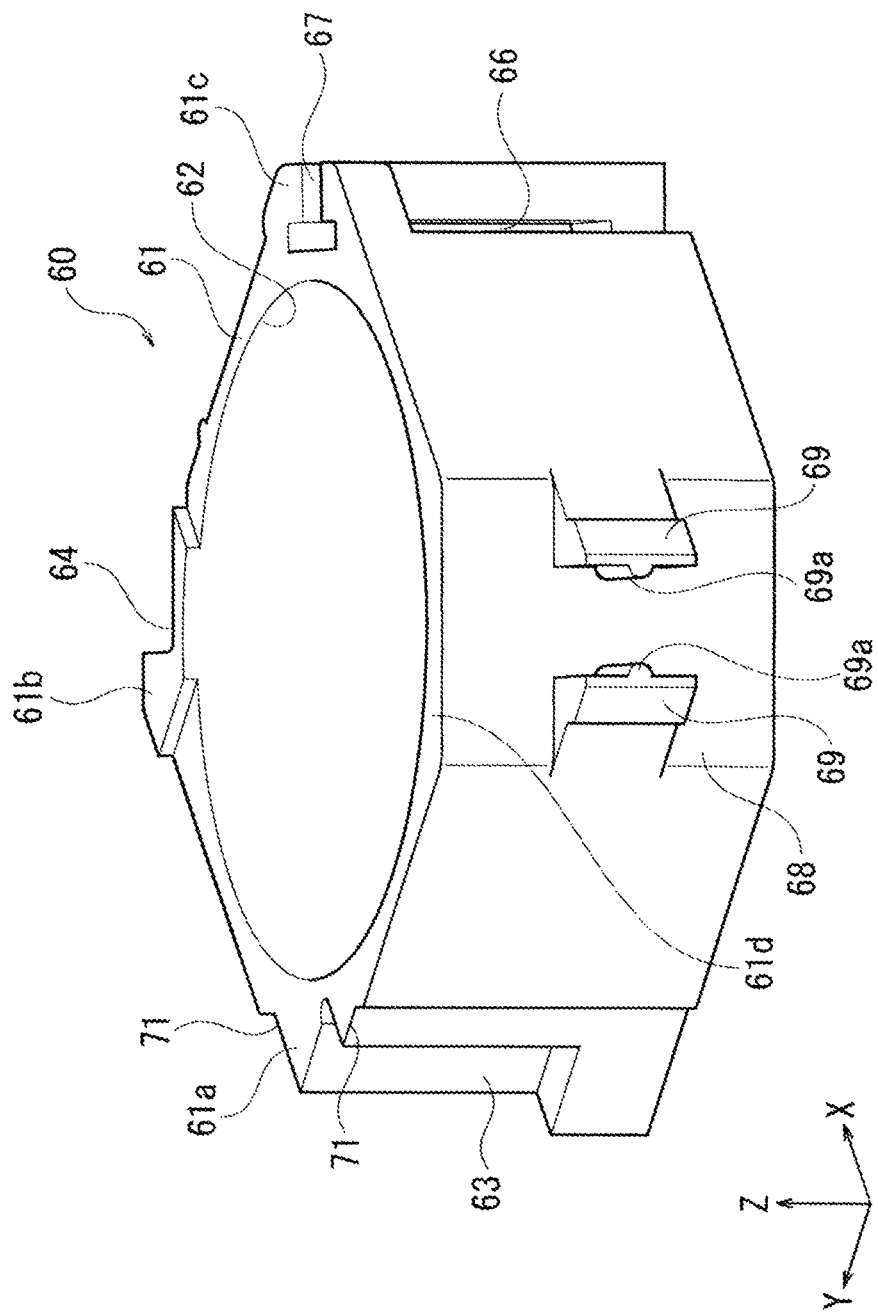
FIG. 3B is a perspective view when the optical element holding portion shown in FIG. 3A is rotated by 180° around a Z axis as a rotation axis.

As shown in FIGS. 3B and 7, the fourth corner portion 61d of the main body portion 61 is provided with a shaft fixing surface 68. The shaft fixing surface 68 is formed from the upper surface to the bottom surface of the main body portion 61 and the substantial central portion thereof in the Z-axis direction is provided with a pair of shaft fixing protrusions 69 and 69. The shaft fixing protrusions 69 and 69 are for fixing the second shaft 85. The shaft fixing protrusions 69 and 69 protrude in a direction substantially perpendicular to the shaft fixing surface 68 with a predetermined length. The protrusion lengths of the shaft fixing protrusions 69 and 69 are substantially equal to the diameter of the second shaft 85.

The respective facing surfaces of the shaft fixing protrusions 69 and 69 are respectively provided with a pair of contact convex portions 69a and 69a. The contact convex portions 69a and 69a protrude in a direction moving close to each other. The contact convex portions 69a and 69a extend in a direction substantially perpendicular to the shaft fixing surface 68 with a predetermined length. Each gap between the contact convex portions 69a and 69a is substantially equal to the diameter of the second shaft 85. By disposing the second shaft 85 between the contact convex portions 69a and 69a, the optical element holding portion 60 can be slidably fixed to the second shaft 85 in such a manner that the second shaft 85 is engaged with the contact convex portions 69a and 69a with a predetermined frictional force. The second shaft 85 regulates the rotation of the optical element holding portion 60 at the positions of the shaft fixing protrusions 69 and 69 (the contact convex portions 69a and 69a).

Figure 8B:
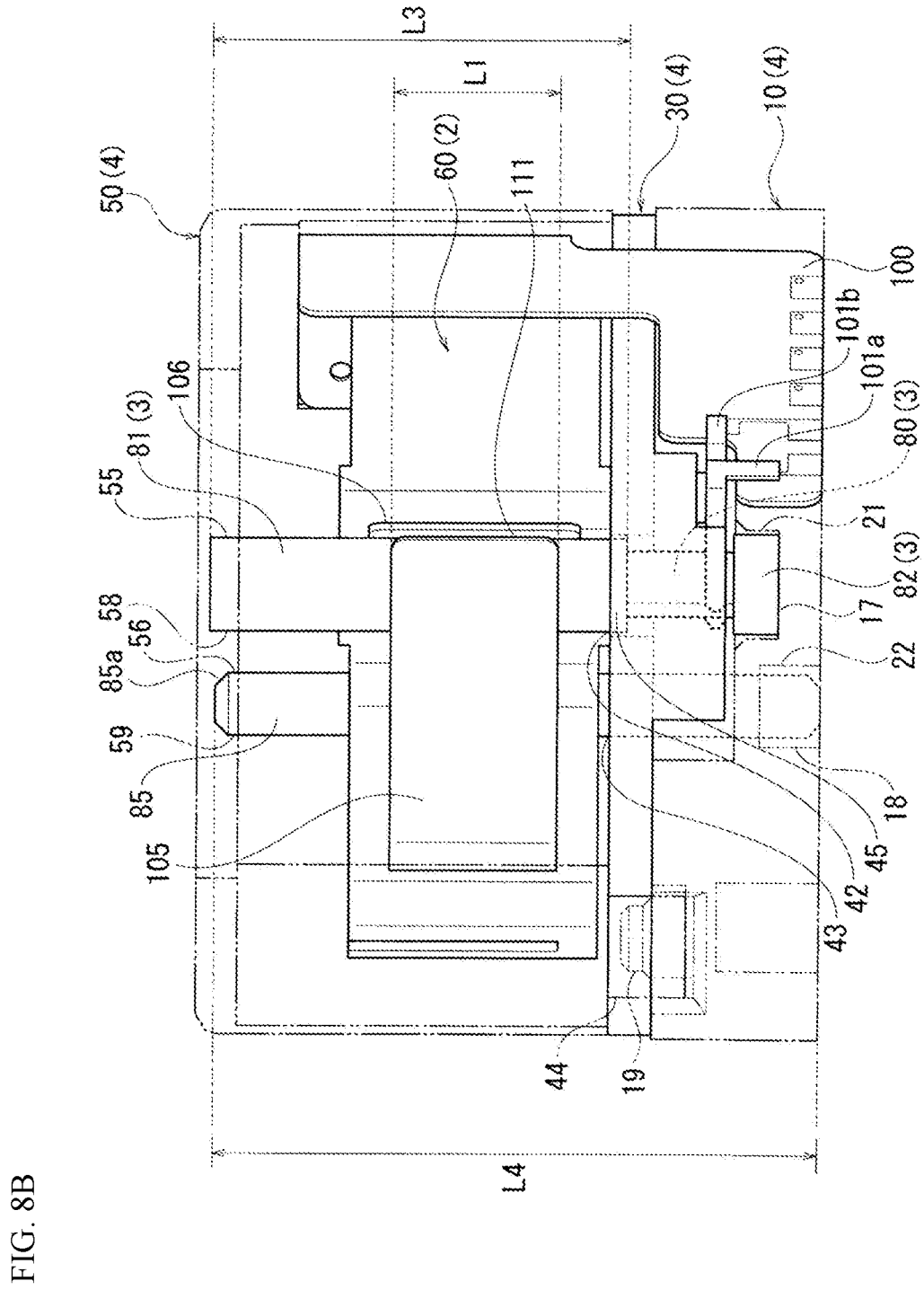
FIG. 8B is a partially transparent perspective view of the optical driving device shown in FIG. 8A.
Figure 8C:
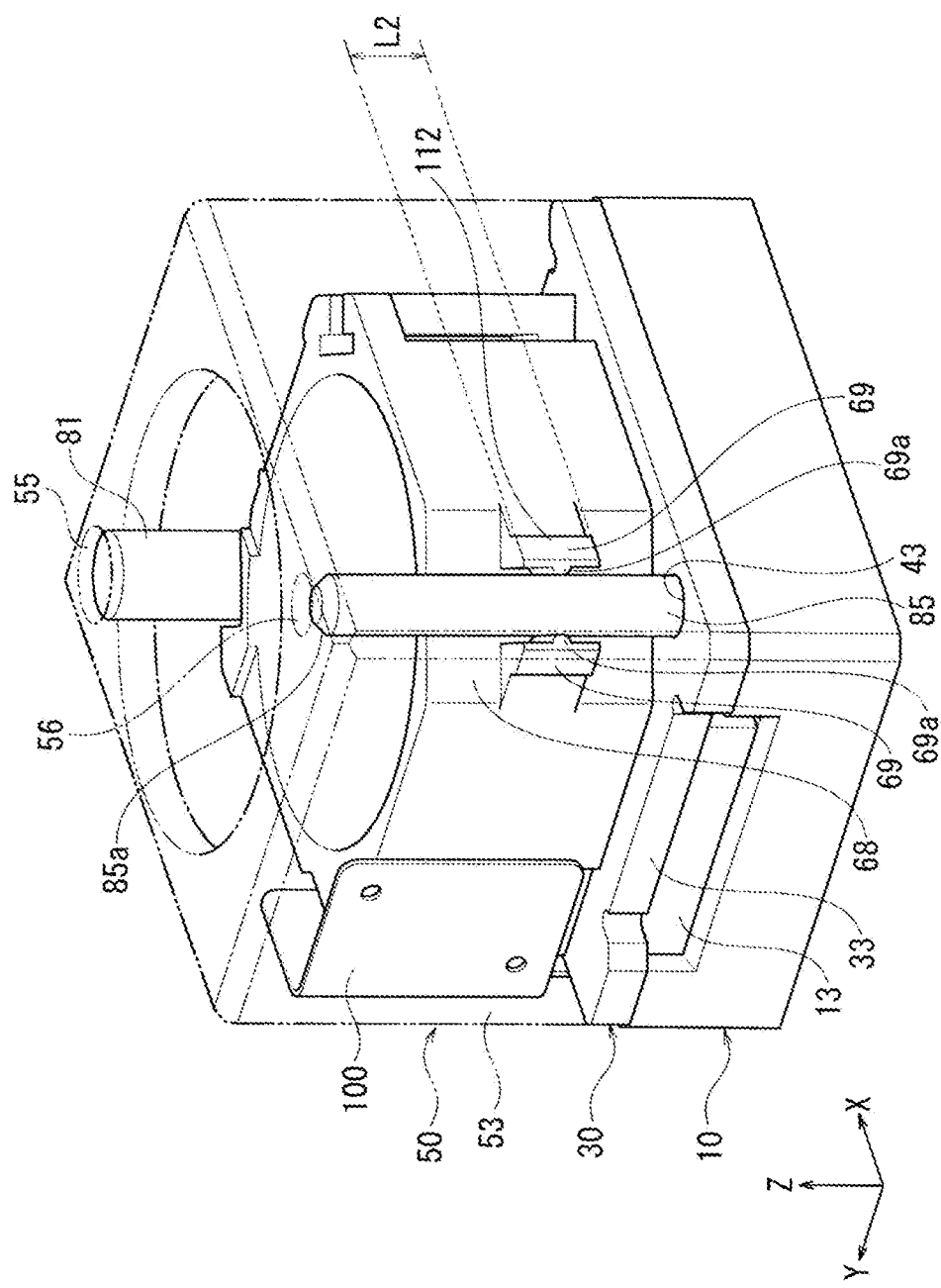
FIG. 8C is a partially transparent perspective view when the optical driving device shown in FIG. 8B is rotated by 180° around a Z axis as a rotation axis.

As shown in FIGS. 8B and 8C, when the length of a holding region 111 of the movable portion 2 held by the first shaft 81 (in other words, the length of the pressing member 105 in the Z-axis direction) L1 is compared with the length of a support region 112 of the movable portion 2 supported by the second shaft 85 (in other words, the length of each of the shaft fixing protrusions 69 and 69 in the Z-axis direction) L2, the length L1 is larger than the length L2.

When the optical driving device 1 is viewed from the side, the support region 112 is located inside both ends of the holding region 111. That is, the upper end of the support region 112 is disposed below the upper end of the holding region 111 and the lower end of the support region 112 is disposed above the lower end of the holding region 111.

As shown in FIG. 2, the fixing portion 4 of this embodiment includes a first fixing portion 10, a second fixing portion 30, and a third fixing portion 50 and holds the drive portion 3 by these portions. The fixing portion 4 is made of a resin such as LCP (liquid crystal polymer). The first fixing portion 10 and the second fixing portion 30 constitute the lower portion of the fixing portion 4 (corresponding to a base member of the related art) and the third fixing portion 50 mainly constitutes the upper portion of the fixing portion 4. The lower portion of the fixing portion 4 of this embodiment is divided into two parts, the first fixing portion 10 and the second fixing portion 30.

Figure 4:
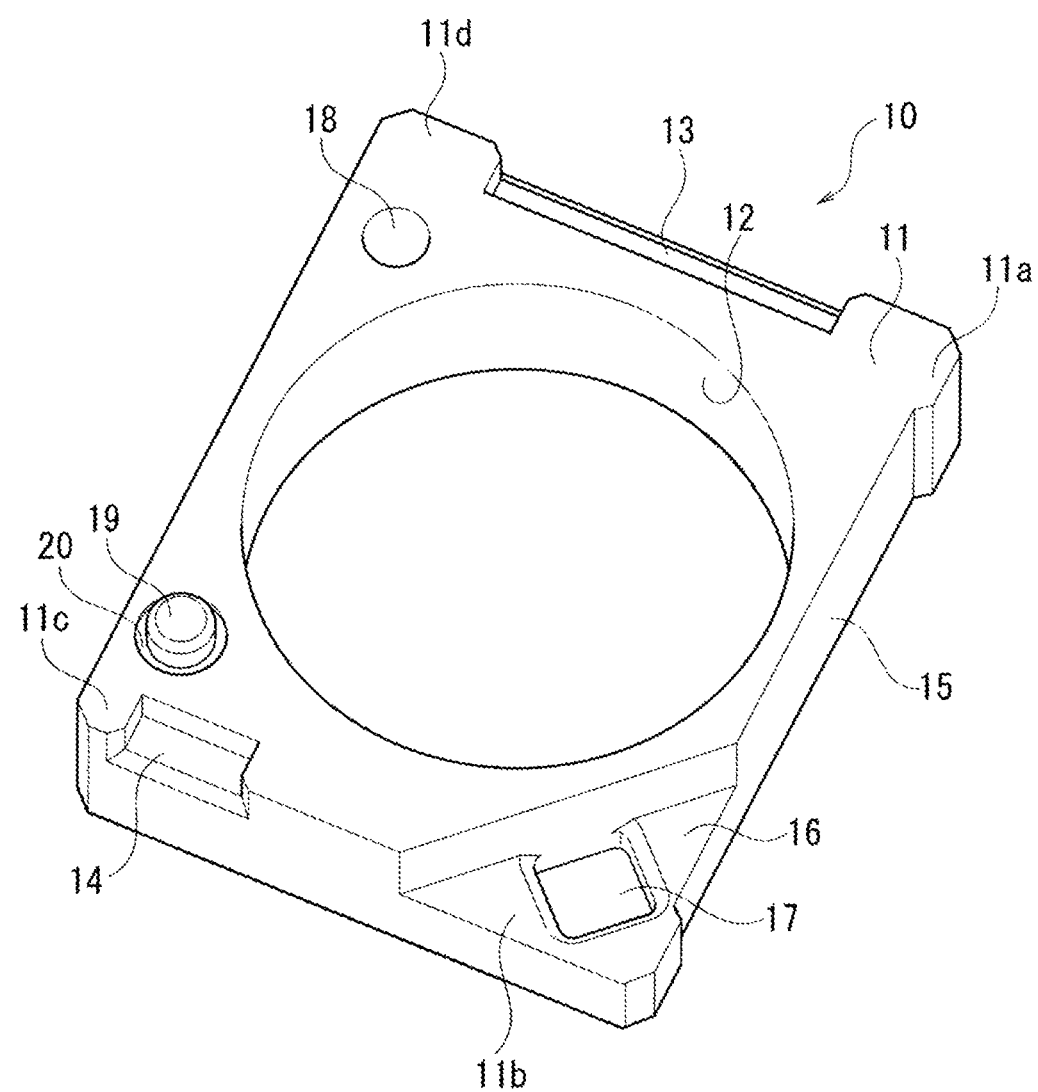
FIG. 4 is a perspective view of a first fixing portion shown in FIG. 2.

As shown in FIG. 4, the first fixing portion 10 includes a first base portion 11. The first base portion 11 has a substantially flat plate shape and the substantial central portion thereof is provided with a first opening portion 12. The first opening portion 12 is formed at a position corresponding to the element installation opening portion 62 formed in the optical element holding portion 60. Hereinafter, for convenience of description, four corner portions provided in the first base portion 11 will be referred to as a first corner portion 11a to a fourth corner portion 11d, respectively.

The side portion located between the first corner portion 11a and the second corner portion 11b of the first base portion 11 is provided with a first lateral concave portion 15. The first lateral concave portion 15 is formed from one end portion to the other end portion of the first base portion 11 in the X-axis direction and has a predetermined depth in the Y-axis direction. The depth in the Y-axis direction of the first lateral concave portion 15 is substantially equal to the thickness of the circuit board 100 shown in FIG. 2 and a part of the circuit board 100 is disposed in the first lateral concave portion 15.

The second corner portion 11b is provided with the stepped corner portion 16. The stepped corner portion 16 is formed to straddle the side portion located between the first corner portion 11a and the second corner portion 11b of the first base portion 11 and the side portion between the second corner portion 11b and the third corner portion 11c. The step surface of the stepped corner portion 16 has a substantially triangular shape when viewed from above and is formed below the upper surface of the first base portion 11 by a predetermined depth.

The stepped corner portion 16 is provided with the fixing concave portion 17. The fixing concave portion 17 has a substantially square shape when viewed from above and the shape is formed in a shape corresponding to the bottom surface of the inertial member 82 shown in FIG. 2. As shown in FIG. 8B, the fixing concave portion 17 has a predetermined depth and the inertial member 82 can be disposed therein. By accommodating the inertial member 82 inside the fixing concave portion 17, the inertial member 82 can be held (fixed) inside the fixing concave portion 17. That is, the fixing concave portion 17 functions as a first holding portion 21 for holding the inertial member 82. The inertial member 82 adheres to the fixing concave portion 17 by a resin. When the fixing concave portion 17 is filled with the resin, the inertial member 82 can be firmly held inside the fixing concave portion 17 by the adhesive force.

In this way, when the inertial member 82 is disposed inside the fixing concave portion 17 and is further adhesively fixed by a resin, the inertial member 82 located at the lower end portion of the drive portion 3 can be firmly held by the first holding portion 21. The resin for fixing the inertial member 82 to the first holding portion 21 is preferably a silicone-based resin. By using the silicone-based resin, the vibration of the drive portion 3 or external impact can be absorbed by the resin and a part of the drive portion 3 can be stably held by the first holding portion 21.

As shown in FIG. 4, the third corner portion 11c of the first base portion 11 is provided with a stepped narrow portion 14. The stepped narrow portion 14 is formed in the corner portion in which the upper surface of the first base portion 11 intersects the side surface (the side surface located between the second corner portion 11b and the third corner portion 11c). A narrow fixing piece 54a (FIG. 6) of the third fixing portion 50 to be described later is adhesively fixed to the stepped narrow portion 14.

A restricted convex portion 19 is formed at a position close to the stepped narrow portion 14. The restricted convex portion 19 is formed in a substantially columnar shape and protrudes upward from the upper surface of the first base portion 11. The end portion of the restricted convex portion 19 is provided with a taper surface. The restricted convex portion 19 is formed to be engaged with a restricted concave portion 44 (FIG. 5) formed on the bottom surface of the second fixing portion 30 to be described later and the relative movement or rotation between the first fixing portion 10 and the second fixing portion 30 can be prevented by the engagement between the restricted convex portion 19 and the restricted concave portion 44. As shown in FIG. 8B, the restricted convex portion 19 is located at a position separated above the position (first holding portion 21) in which the first fixing portion 10 (fixing concave portion 17) holds the inertial member 82.

As shown in FIG. 4, a ring-shaped groove portion 20 is formed on the upper surface of the first base portion 11 to surround the periphery of the restricted convex portion 19. The ring-shaped groove portion 20 is for preventing the upper surface of the first fixing portion 10 and the bottom surface of the second fixing portion 30 when the first fixing portion 10 and the second fixing portion 30 are combined with each other. That is, since the ring-shaped groove portion 20 is formed around the restricted convex portion 19, the rattling at the joint portion between the upper surface of the first base portion 11 and a bottom surface of a second base portion 31 can be prevented by the burr around the restricted convex portion 19.

The fourth corner portion 11d of the first base portion 11 is provided with a first small diameter hole 18. The first small diameter hole 18 is formed as a through-hole and the second shaft 85 shown in FIG. 2 can be inserted therethrough. The first small diameter hole 18 has a circular shape when viewed from above and the diameter of the first small diameter hole 18 is substantially equal to or larger than the diameter of the second shaft 85. The lower end portion of the second shaft 85 is held (supported) by the first small diameter hole 18 by inserting the lower end portion of the second shaft 85 through the first small diameter hole 18. That is, as shown in FIG. 8B, the first small diameter hole 18 functions as the fourth holding portion 22 for holding the lower end portion of the second shaft 85. The lower end portion of the second shaft 85 adheres to the first small diameter hole 18 by a resin.

In this way, when the lower end portion of the second shaft 85 is disposed inside the first small diameter hole 18 and is further adhesively fixed by a resin, the lower end portion of the second shaft 85 can be firmly held by the fourth holding portion 22.

The resin for fixing the lower end portion of the second shaft 85 to the fourth holding portion 22 is preferably an epoxy-based resin. Since the second shaft 85 has a function as a column connecting the first fixing portion 10 and the third fixing portion 50, the lower end portion of the second shaft 85 is fixed to the first fixing portion 10 with a sufficient adhesive force so that the structure strength of the fixing portion 4 can be sufficiently ensured by fixing the lower end portion of the second shaft 85 to the first fixing portion 10 using the epoxy-based resin. Further, since the second shaft 85 is stably held by the first fixing portion 10, the optical element holding portion 60 can be stably supported by the second shaft 85.

As shown in FIG. 4, a stepped wide portion 13 is formed between the first corner portion 11a and the fourth corner portion 11d. The stepped wide portion 13 is formed in the corner portion in which the upper surface of the first base portion 11 intersects the side surface (the side surface located between the first corner portion 11a and the fourth corner portion 11d). The width in the Y-axis direction of the stepped wide portion 13 is wider than the width in the Y-axis direction of the stepped narrow portion 14. A wide fixing piece 53a (FIG. 6) of the third fixing portion 50 is adhesively fixed to the stepped wide portion 13.

Figure 5:
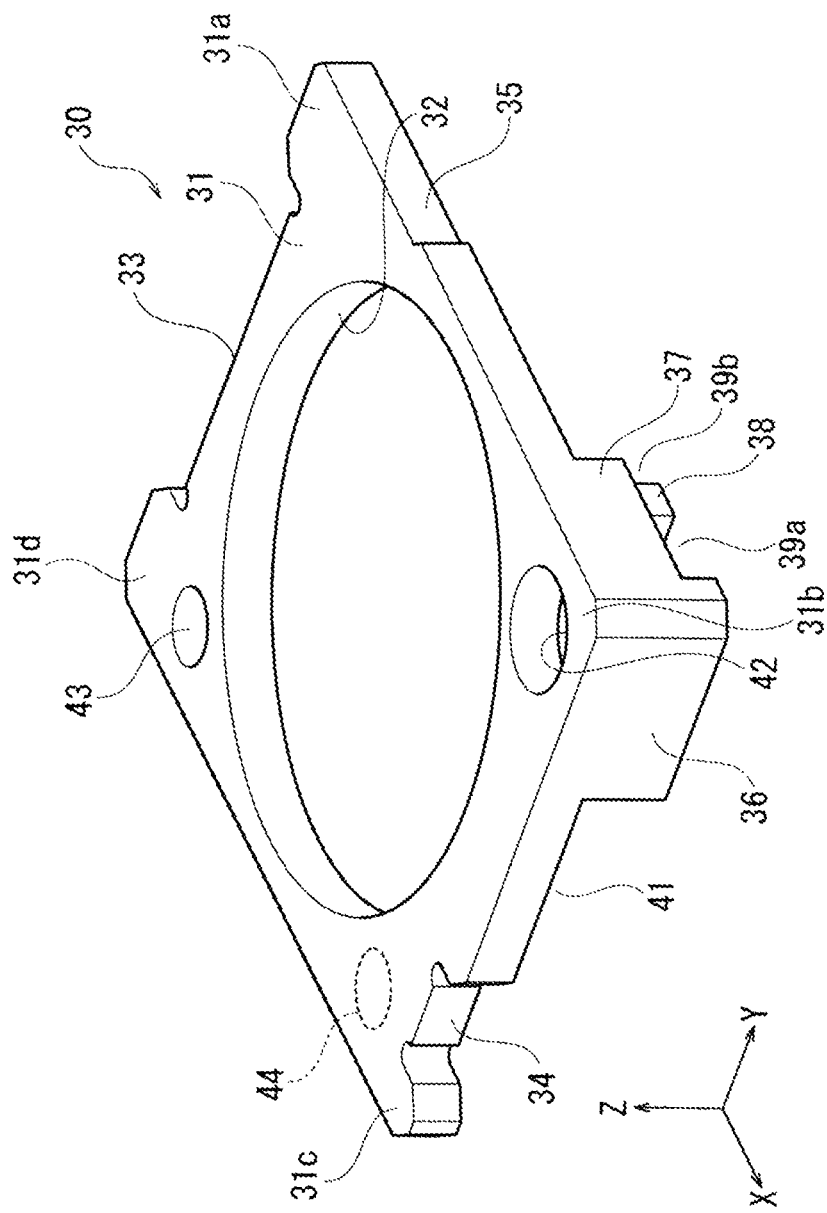
FIG. 5 is a perspective view of a second fixing portion shown in FIG. 2.

As shown in FIG. 8A, the second fixing portion 30 is supported by the first fixing portion 10 and is disposed (placed) above the first fixing portion 10. As shown in FIG. 5, the second fixing portion 30 includes the second base portion 31. The second base portion 31 has a substantially flat plate shape and the substantial central portion thereof is provided with a second opening portion 32. The second opening portion 32 is formed at a position corresponding to the first opening portion 12 of the first fixing portion 10. Hereinafter, for convenience of description, four corner portions provided in the second base portion 31 will be referred to as a first corner portion 31a to a fourth corner portion 31d, respectively.

The first corner portion 31a of the second base portion 31 is provided with a second lateral concave portion 35. The second lateral concave portion 35 is formed in the side portion located between the first corner portion 31a and the second corner portion 31b of the second base portion 31 and has a predetermined depth in the Y-axis direction. The concave bottom surface of the second lateral concave portion 35 is substantially flush with the concave bottom surface of the first lateral concave portion 15 of the first fixing portion 10 shown in FIG. 4 and a part of the circuit board 100 shown in FIG. 2 can be disposed to straddle the first lateral concave portion 15 and the second lateral concave portion 35.

The second corner portion 32a of the second base portion 31 is provided with a long protrusion portion 36 and a short protrusion portion 37. The long protrusion portion 36 and the short protrusion portion 37 are arranged to be orthogonal to each other and are arranged inside the stepped corner portion 16 of the first fixing portion 10 as shown in FIG. 8A. As shown in FIG. 5, the long protrusion portion 36 is formed in the side portion located between the second corner portion 31b and the third corner portion 31c of the second base portion 31 and the short protrusion portion 37 is formed in the side portion located between the first corner portion 31a and the second corner portion 31b of the second base portion 31. The long protrusion portion 36 extends in the Y-axis direction and has a predetermined thickness in the X-axis direction. The short protrusion portion 37 extends in the X-axis direction and has a predetermined thickness in the Y-axis direction. The downward protrusion length of the long protrusion portion 36 is larger than the downward protrusion length of the short protrusion portion 37 and a step is formed between the bottom surface of the long protrusion portion 36 and the bottom surface of the short protrusion portion 37.

The bottom surface of the short protrusion portion 37 is provided with a protruding columnar portion 38. The protruding columnar portion 38 is formed at a position separated from the long protrusion portion 36 by a predetermined distance and protrudes downward. The downward protrusion length of the protruding columnar portion 38 is equal to the step width between the bottom surface of the long protrusion portion 36 and the bottom surface of the short protrusion portion 37.

A frame insertion passage 39a is formed on one side of the X-axis direction of the protruding columnar portion 38. The frame insertion passage 39a is formed as a space formed between the protruding columnar portion 38 and the long protrusion portion 36 and a lead frame 101a shown in FIG. 2 can be pulled out toward the circuit board 100 along the periphery of the protruding columnar portion 38 through the frame insertion passage 39a (FIG. 8A).

A frame insertion passage 39b is formed on the side opposite to the frame insertion passage 39a with the protruding columnar portion 38 interposed therebetween. The frame insertion passage 39b is formed as a space similarly to the frame insertion passage 39a and the lead frame 101b shown in FIG. 2 can be pulled out toward the circuit board 100 along the periphery of the protruding columnar portion 38 through the frame insertion passage 39b (FIG. 8A). The lead frames 101a and 101b can be satisfactorily insulated from each other by pulling out the lead frame 101a from one side and pulling out the lead frame 101b from the other side with the protruding columnar portion 38 interposed therebetween.

The second corner portion 31b of the second base portion 31 is provided with a second large diameter hole 42. The second large diameter hole 42 is formed as a through-hole and penetrates the second base portion 31 in the Z-axis direction. The first shaft 81 can be inserted through the second large diameter hole 42.

The second large diameter hole 42 has a circular shape when viewed from above and the diameter of the second large diameter hole 42 is substantially equal to or larger than the diameter of the first shaft 81. As shown in FIG. 8B, the lower end portion of the first shaft 81 is disposed (inserted) inside the second large diameter hole 42 and the lower end portion of the first shaft 81 is held (fixed) inside the second large diameter hole 42. That is, the second large diameter hole 42 functions as a second holding portion 45 for holding the lower end portion of the first shaft 81. In this way, in this embodiment, a configuration in which the second fixing portion 30 holds a part of the drive portion 3 is provided.

The lower end portion of the first shaft 81 adheres to the second large diameter hole 42 by a resin. When the second large diameter hole 42 is filled with a resin, the lower end portion of the first shaft 81 can be firmly held inside the second large diameter hole 42 due to the adhesive force.

In this way, when the first shaft 81 is disposed inside the second large diameter hole 42 and is further adhesively fixed by a resin, the lower end portion of the first shaft 81 located below the drive portion 3 can be firmly held by the second holding portion 45. The resin for fixing the lower end portion of the first shaft 81 to the second holding portion 45 is preferably a silicone-based resin. Since the vibration of the drive portion 3 or external impact can be absorbed by the resin by using the silicone-based resin, a part of the drive portion 3 can be stably held by the second holding portion 45. As described above, in this embodiment, the drive portion 3 is held by the first holding portion 21 (fixing concave portion 17) in the first fixing portion 10 and the drive portion 3 is held by the second holding portion 45 (second large diameter hole 42) in the second fixing portion 30.

As shown in FIG. 5, a contact fixing portion 41 is formed between the second corner portion 31b and the third corner portion 31c of the second base portion 31. As shown in FIG. 8A, the contact fixing portion 41 constitutes a part of the bottom surface of the second base portion 31 and comes into contact with the upper surface of the first base portion 11 of the first fixing portion 10 to be fixed (supported). Additionally, the bottom surface of the second base portion 31 also constitutes the contact surface with the upper surface of the first base portion 11 even in a portion other than the contact fixing portion 41, but in this embodiment, the contact surface formed adjacent to the long protrusion portion 36 in the Y-axis direction is particularly referred to as the contact fixing portion 41.

In a state in which the contact fixing portion 41 comes into contact with the upper surface of the first base portion 11, a gap is partially formed between the upper surface of the first fixing portion 10 and the bottom surface of the second fixing portion 30. Particularly, a resin filling space 40 is formed between the bottom surface of the long protrusion portion 36 and the upper surface of the first base portion 11 as the gap. The resin filling space 40 is filled with, for example, an epoxy-based resin and the upper surface of the first base portion 11 and the bottom surface of the long protrusion portion 36 can be firmly fixed through the resin. Additionally, the same gap is also formed between the bottom surface of the protruding columnar portion 38 and the upper surface of the first base portion 11.

As shown in FIG. 5, the third corner portion 31c of the second base portion 31 is provided with a concave narrow portion 34. The concave narrow portion 34 is formed in the side portion located between the second corner portion 31b and the third corner portion 31c and has a predetermined depth in the X-axis direction. The concave bottom surface of the concave narrow portion 34 is disposed to be substantially flush with the concave bottom surface of the stepped narrow portion 14 of the first fixing portion 10 shown in FIG. 4 and the narrow fixing piece 54a (FIG. 6) of the third fixing portion 50 is adhesively fixed to straddle the concave narrow portion 34 and the stepped narrow portion 14. Additionally, curved recesses are formed on both sides in the Y-axis direction on the bottom surface of the concave narrow portion 34. However, when such recesses are formed, the recesses are filled with a resin and the adhesiveness of the concave narrow portion 34, the stepped narrow portion 14, and the narrow fixing piece 54a can be improved.

The restricted concave portion 44 is formed at a position adjacent to the concave narrow portion 34. The restricted concave portion 44 is formed on the bottom surface of the second base portion 31 and is formed at a position corresponding to the restricted convex portion 19 of the first fixing portion 10. The restricted concave portion 44 has a shape corresponding to the restricted convex portion 19 and can be engaged with the restricted convex portion 19.

The fourth corner portion 31d of the second base portion 31 is provided with a second small diameter hole 43. The second small diameter hole 43 is formed as a through-hole and penetrates the second base portion 31 in the Z-axis direction. The second small diameter hole 43 is disposed diagonally with respect to the second large diameter hole 42 with the second opening portion 32 interposed therebetween. The second small diameter hole 43 has a circular shape when viewed from above and as shown in FIGS. 8B and 8C, the second shaft 85 can be inserted through the second small diameter hole 43. The diameter of the second small diameter hole 43 is substantially equal to or larger than the diameter of the second shaft 85 and is smaller than the diameter of the second large diameter hole 42.

In the second small diameter hole 43, the second shaft 85 is only inserted therethrough and the insertion portion is not fixed into the second small diameter hole 43 by a resin or the like. Since the diameter of the second small diameter hole 43 is substantially equal to the diameter of the second shaft 85, when the second shaft 85 is inserted through the second small diameter hole 43, the insertion portion is held by the second small diameter hole 43.

As shown in FIG. 5, a concave wide portion 33 is formed in the side portion located between the first corner portion 31a and the fourth corner portion 31d of the second base portion 31. As shown in FIG. 8C, the width in the Y-axis direction of the concave wide portion 33 is substantially equal to the width in the Y-axis direction of the stepped wide portion 13 of the first fixing portion 10 and the concave bottom surface of the concave wide portion 33 is substantially flush with the concave bottom surface of the stepped wide portion 13. When the first fixing portion 10 and the second fixing portion 30 are combined, the wide fixing piece 53a (FIG. 6) of the third fixing portion 50 is adhesively fixed to straddle the concave wide portion 33 and the stepped wide portion 13.

Figure 6:
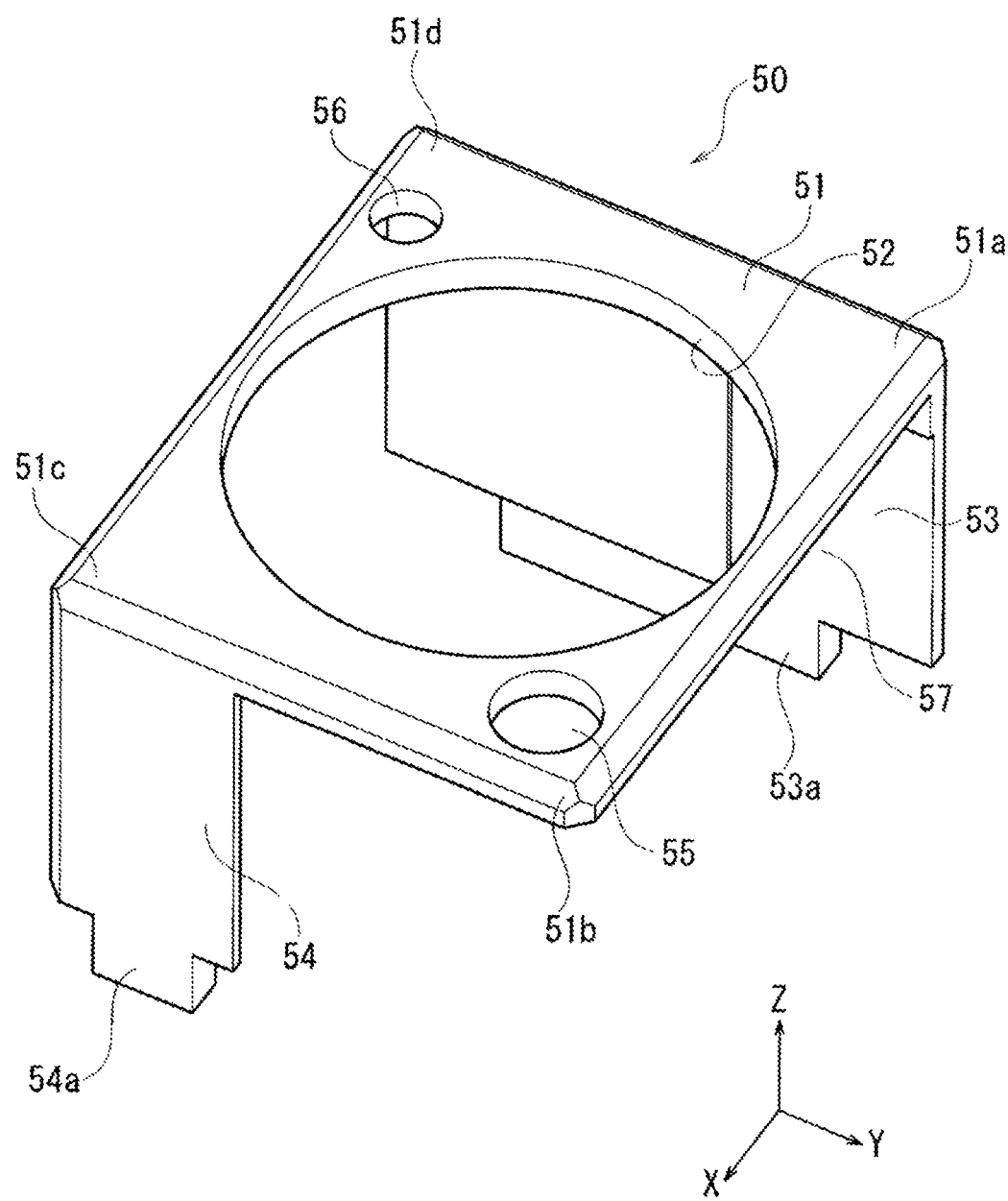
FIG. 6 is a perspective view of a third fixing portion shown in FIG. 2.

As shown in FIG. 6, the third fixing portion 50 includes a top plate portion 51. The top plate portion 51 has a substantially flat plate shape and the substantial central portion thereof is provided with a third opening portion 52. The third opening portion 52 is formed at a position corresponding to the first opening portion 12 of the first fixing portion 10 and the second opening portion 32 of the second fixing portion 30. Hereinafter, for convenience of description, four corner portions provided in the top plate portion 51 will be referred to as a first corner portion 51a to a fourth corner portion 51d, respectively.

The second corner portion 51b of the top plate portion 51 is provided with a third large diameter hole 55. The third large diameter hole 55 is formed as a through-hole and penetrates the top plate portion 51 in the Z-axis direction. The first shaft 81 can be inserted through the third large diameter hole 55.

The third large diameter hole 55 has a circular shape when viewed from above and the diameter of the third large diameter hole 55 is substantially equal to or larger than the diameter of the first shaft 81. As shown in FIG. 8B, the upper end portion of the first shaft 81 is disposed (inserted) inside the third large diameter hole 55 and the upper end portion of the first shaft 81 is held (fixed) inside the third large diameter hole 55. That is, the third large diameter hole 55 functions as a third holding portion 58 for holding the upper end portion of the first shaft 81. In this way, in this embodiment, a configuration in which the third fixing portion 50 holds a part of the drive portion 3 can be obtained and further a configuration in which the third fixing portion 50 is supported by the first fixing portion 10 and the second fixing portion 30 through the first shaft 81 can be obtained.

The upper end portion of the first shaft 81 adheres to the third large diameter hole 55 by a resin. When the third large diameter hole 55 is filled with the resin, the upper end portion of the first shaft 81 can be firmly held inside the third large diameter hole 55 by the adhesive force.

In this way, when the first shaft 81 is disposed inside the third large diameter hole 55 and is further adhesively fixed by the resin, the upper end portion of the first shaft 81 located above the drive portion 3 can be firmly held by the third holding portion 58. The resin for fixing the upper end portion of the first shaft 81 to the third holding portion 58 is preferably a silicone-based resin. Since the vibration of the drive portion 3 or external impact can be absorbed by the resin by using the silicone-based resin, a part of the drive portion 3 can be stably held by the third holding portion 58. Further, a defect of the joint portion between the third large diameter hole 55 and the upper end portion of the first shaft 81 caused by the thermal contraction (linear expansion) of the first shaft 81 can be prevented.

Here, the distance between the position in which the upper end portion of the first shaft 81 is fixed into the third large diameter hole 55 of the third fixing portion 50 and the position in which the lower end portion of the first shaft 81 is fixed into the second large diameter hole 42 of the second fixing portion 30 (the distance between the fixing positions of the fixing portion 4 to which the upper end portion and the lower end portion of the first shaft 81 are fixed or the distance between the second holding portion 45 and the third holding portion 58) is indicated by L3. Further, the distance between the position in which the upper end portion of the second shaft 85 is fixed into the third small diameter hole 56 of the third fixing portion 50 and the position in which the lower end portion of the second shaft 85 is fixed into the first small diameter hole 18 of the first fixing portion 10 (the distance between the fixing positions of the fixing portion 4 to which the end portions of the second shaft 85 are fixed or the distance between the fourth holding portion 22 and the fifth holding portion 59) is indicated by L4. In this embodiment, the distance L3 is smaller than the distance L4.

As shown in FIG. 6, the third corner portion 51c of the top plate portion 51 is provided with a narrow protrusion portion 54. The narrow protrusion portion 54 is formed in the side portion located between the second corner portion 51b and the third corner portion 51c of the top plate portion 51. The narrow protrusion portion 54 has a plane parallel to the YZ plane and protrudes downward. As shown in FIG. 8A, when the third fixing portion 50 is combined with the first fixing portion 10 and the second fixing portion 30, the narrow protrusion portion 54 connects the top plate portion 51 and the second fixing portion 30.

The lower end portion of the narrow protrusion portion 54 is provided with a narrow fixing piece 54a. The width in the Y-axis direction of the narrow fixing piece 54a is smaller than the width in the Y-axis direction of the narrow protrusion portion 54 and as shown in FIG. 8A, the stepped narrow portion 14 of the first fixing portion 10 and the concave narrow portion 34 of the second fixing portion 30 have substantially the same width in the Y-axis direction. The narrow fixing piece 54a is disposed to straddle the stepped narrow portion 14 and the concave narrow portion 34 connected in the Z-axis direction and is adhesively fixed thereto by a resin.

As shown in FIG. 6, the fourth corner portion 51d of the top plate portion 51 is provided with a third small diameter hole 56. The third small diameter hole 56 is formed as a through-hole and penetrates the top plate portion 51 in the Z-axis direction. The third small diameter hole 56 is disposed diagonally with respect to the third large diameter hole 55 with the third opening portion 52 interposed therebetween. The third small diameter hole 56 has a circular shape when viewed from above and the second shaft 85 can be inserted through the third small diameter hole 56 as shown in FIGS. 8B and 8C. The diameter of the third small diameter hole 56 is substantially equal to or larger than the diameter of the second shaft 85 and is smaller than the diameter of the third large diameter hole 55.

The upper end portion of the second shaft 85 is disposed (inserted) inside the third small diameter hole 56 and the upper end portion of the second shaft 85 is held (fixed) inside the third small diameter hole 56. That is, the third small diameter hole 56 functions as a fifth holding portion 59 for holding the upper end portion of the second shaft 85.

The upper end portion of the second shaft 85 adheres to the third small diameter hole 56 by a resin. When the third small diameter hole 56 is filled with the resin, the upper end portion of the second shaft 85 can be firmly held inside the third small diameter hole 56 by the adhesive force. The resin for fixing the upper end portion of the second shaft 85 to the fifth holding portion 59 is preferably a silicone-based resin. By using a silicone-based resin, the vibration of the drive portion 3 or external impact can be absorbed by the resin. Further, a defect of the joint portion between the third small diameter hole 56 and the upper end portion of the second shaft 85 caused by the thermal contraction (linear expansion) of the second shaft 85 can be prevented.

A taper surface 85a is formed at the upper end portion of the second shaft 85 so that the surface area increases. Therefore, a sufficient adhesive area with the resin filled inside the third small diameter hole 56 can be secured at the upper end portion of the second shaft 85 and the second shaft 85 can be firmly fixed into the third small diameter hole 56 through the resin. Further, since the taper surface 85a is formed, an effect that the resin can be easily poured into the third small diameter hole 56 from the outside (above) can be obtained. Additionally, the lower end portion of the second shaft 85 is also provided with the same taper surface and the adhesive area with the resin filled inside the first small diameter hole 18 of the first fixing portion 10 can be secured sufficiently.

As shown in FIGS. 6 and 8C, a wide protrusion portion 53 is formed in the side portion located between the first corner portion 51a and the fourth corner portion 51d of the top plate portion 51. The wide protrusion portion 53 has a plane parallel to the YZ plane and protrudes downward. When the third fixing portion 50 is combined with the first fixing portion 10 and the second fixing portion 30, the wide protrusion portion 53 connects the top plate portion 51 and the second fixing portion 30.

As shown in FIGS. 6 and 8C, the lower end portion of the wide protrusion portion 53 is provided with a wide fixing piece 53a. The width in the Y-axis direction of the wide fixing piece 53a is smaller than the width in the Y-axis direction of the wide protrusion portion 53 and the stepped wide portion 13 of the first fixing portion 10 and the concave wide portion 33 of the second fixing portion 30 have substantially the same width in the Y-axis direction. The wide fixing piece 53a is disposed to straddle the stepped wide portion 13 and the concave wide portion 33 connected in the Z-axis direction and is adhesively fixed thereto by a resin.

As shown in FIGS. 6 and 8A, a step is formed on the inner surface of the wide protrusion portion 53 and a stepped side surface 57 is formed in a portion lowered by the step. A part of the circuit board 100 is disposed on the stepped side surface 57. When a part of the circuit board 100 is disposed on the stepped side surface 57, the surface of the circuit board is substantially flush with the inner surface of the wide protrusion portion 53 (a portion adjacent to the stepped side surface 57).

As shown in FIG. 2, the cover 90 is made of a metal such as SUS and includes a cover top plate portion 91. The cover top plate portion 91 has a substantially flat plate shape and the substantial central portion thereof is provided with a cover opening portion 92. The cover opening portion 92 is formed at a position corresponding to the third opening portion 52 of the third fixing portion 50.

Four downward extension portions 93 are integrally formed with the side portion of the cover top plate portion 91 and the side portion of the cover top plate portion 91 is surrounded by each downward extension portions 93. Each downward extension portion 93 extends downward and a groove portion 94 is formed between the adjacent downward extension portions 93 and 93. As shown in FIG. 1, the downward extension portions 93 are arranged to surround the periphery of the optical driving device 1.

Next, a method of manufacturing the optical driving device 1 will be mainly described with reference to FIG. 2 and the like by focusing on a method of assembling the fixing portion 4. First, the members shown in FIG. 2 are prepared. Additionally, the piezoelectric element 80, the first shaft 81, and the inertial member 82 constituting the drive portion 3 are prepared while these members are combined.

The assembly of these members is formed in such a manner that the lower end portion of the first shaft 81 adheres to the upper end portion of the piezoelectric element 80 by a resin and the upper end portion of the inertial member 82 adheres to the lower end portion of the piezoelectric element 80 by a resin.

The third fixing portion 50 may be prepared while a part of the circuit board 100 is fixed to the stepped side surface 57 in advance. The circuit board 100 has a bent portion bent at a right angle, but this bent portion is preferably formed after the circuit board 100 is fixed to the third fixing portion 50. In the optical element holding portion 60, as shown in FIG. 7, the end portion of the pressing member 105 may be inserted into the pressing member installation hole 66, the engagement portion 106 may be engaged with the shaft sliding groove portion 64, and the sensor magnet 103 may be placed on the magnetic body installation step portion 63.

Next, the second fixing portion 30 is combined with the third fixing portion 50 shown in FIG. 2. At this time, the wide fixing piece 53*a* of the third fixing portion 50 is engaged with the concave wide portion 33 of the second fixing portion 30 so that the lower end portion of the wide protrusion portion 53 of the third fixing portion 50 is fixed to the upper surface of the second base portion 31 of the second fixing portion 30. Further, the narrow fixing piece 54*a* of the third fixing portion 50 is engaged with the concave narrow portion 34 of the second fixing portion 30 so that the lower end portion of the narrow protrusion portion 54 of the third fixing portion 50 is fixed to the upper surface of the second base portion 31 of the second fixing portion 30. Accordingly, the second fixing portion 30 is temporarily fixed to the third fixing portion 50. At the time of combining the second fixing portion 30 with the third fixing portion 50, the combination is performed while the optical element holding portion 60 is disposed between the second fixing portion 30 and the third fixing portion 50.

Next, the above-described assembly of the piezoelectric element 80, the first shaft 81, and the inertial member 82 is combined with the assembly of the second fixing portion 30 and the third fixing portion 50. More specifically, the first shaft 81 is sequentially inserted through each of the second large diameter hole 42 of the second fixing portion 30 and the third large diameter hole 55 of the third fixing portion 50. Accordingly, the lower end portion of the first shaft 81 is disposed inside the second large diameter hole 42 of the second fixing portion 30 and is held by the second fixing portion 30 (the second holding portion 45 shown in FIG. 8B). Further, the upper end portion of the first shaft 81 is disposed inside the third large diameter hole 55 of the third fixing portion 50 and is held by the third fixing portion 50 (the third holding portion 58 shown in FIG. 8B). At this time, the optical element holding portion 60 may be held by the first shaft 81 in such a manner that the first shaft 81 is sandwiched between the engagement portion 106 and the pressing member 105 fixed to the optical element holding portion 60 and the first shaft 81 is engaged with the corner member with a predetermined frictional force.

Next, the first fixing portion 10 is combined with the assembly of the second fixing portion 30 and the third fixing portion 50. The lower end portion of the second shaft 85 is adhesively fixed into the first small diameter hole 18 of the first fixing portion 10 by a resin and the lower end portion of the second shaft 85 is firmly held by the first fixing portion 10. As the resin used at this time, an epoxy-based resin is preferable.

At the time of combining the first fixing portion 10 with the assembly of the second fixing portion 30 and the third fixing portion 50, the upper surface of the first base portion 11 of the first fixing portion 10 is brought into contact with the lower surface of the second base portion 31 of the second fixing portion 30 while the restricted concave portion 44 (FIG. 5) of the second fixing portion 30 is fitted to the restricted convex portion 19 of the first fixing portion 10.

Further, the inertial member 82 is disposed inside the fixing concave portion 17 of the first fixing portion 10 and the inertial member 82 is held by the first fixing portion 10 (the first holding portion 21 shown in FIG. 8B).

Further, the second shaft 85 is sequentially inserted through each of the second small diameter hole 43 of the second fixing portion 30 and the third small diameter hole 56 of the third fixing portion 50. At this time, as shown in FIG. 7, the second shaft 85 is sandwiched between the pair of contact convex portions 69*a* and 69*a* (FIG. 3B) formed in the pair of shaft fixing protrusions 69 and 69 of the optical element holding portion 60. Accordingly, the fixing protrusions 69 and 69 are frictionally engaged with the second shaft 85 with a predetermined frictional force and the optical element holding portion 60 can be movably fixed in the Z-axis direction on the second shaft 85.

Next, the inertial member 82 shown in FIG. 2 is adhesively fixed into the fixing concave portion 17 by a resin and the inertial member 82 is firmly held by the first fixing portion 10. Further, the lower end portion of the first shaft 81 is adhesively fixed into the second large diameter hole 42 by a resin and the lower end portion of the first shaft 81 is firmly held by the second fixing portion 30. Further, the upper end portion of the first shaft 81 is adhesively fixed into the third large diameter hole 55 by a resin and the upper end portion of the first shaft 81 is firmly held by the third fixing portion 50. At the time of the adhesive fixing, a silicone-based resin is preferably used. Additionally, the timing of performing the above adhesive fixing is not particularly limited and, for example, the adhesive fixing may be performed when the assembly of the piezoelectric element 80, the first shaft 81, and the inertial member 82 is combined with the assembly of the second fixing portion 30 and the third fixing portion 50.

Further, the upper end portion of the second shaft 85 is adhesively fixed into the third small diameter hole 56 by a resin and the upper end portion of the second shaft 85 is firmly held by the third fixing portion 50. As the resin used at this time, a silicone-based resin is preferable.

As described above, in the optical driving device 1 according to this embodiment, as shown in FIGS. 2 and 8B, each end portion of the first shaft 81 provided in the drive portion 3 and slidably holding the movable portion 2 and each portion of the second shaft 85 provided separately from the drive portion 3 and slidably supporting the movable portion 2 are fixed to the fixing portion 4. Therefore, the support structure of the fixing portion 4 is reinforced by two shafts of the first shaft 81 and the second shaft 85 and the structural strength of the assembly of the fixing portion 4 (the first fixing portion 10, the second fixing portion 30, and the third fixing portion 50) and these two shafts 81 and 85 is increased. Thus, the resistance of the fixing portion 4 against the load (vibration or the like) can be increased, the fixing portion 4 can be effectively protected from the vibration generated by the drive portion 3, and the malfunction of the movable portion 2 caused by the vibration of the fixing portion 4 can be prevented. Further, since the movable portion 2 is slidably held (or supported) through two shafts 81 and 85, the movable portion 2 can be stably driven by the drive portion 3.

Further, in the optical driving device 1 according to this embodiment, the diameter of the first shaft 81 is larger than the diameter of the second shaft 85 and the distance L3 between the fixing positions of the fixing portion 4 to which each end portion of the first shaft 81 is fixed is smaller than the distance L4 between the fixing positions of the fixing portion 4 to which each end portion of the second shaft 85 is fixed. Therefore, the structural strength of the assembly of the fixing portion 4 (the first fixing portion 10, the second fixing portion 30, and the third fixing portion 50) and two shafts 81 and 85 can be remarkably increased and the resistance of the first shaft 81 against the own weight or the weight of the movable portion 2 can be increased. Thus, the first shaft 81 can be effectively protected from breakage or bending and the positional accuracy of the movable portion 2 can be improved.

As described above, according to this embodiment, the highly reliable optical driving device 1 can be realized.

Further, in this embodiment, the drive portion 3 includes the piezoelectric element 80 connected to the end portion of the first shaft 81 and the diameter of the first shaft 81 is larger than the diameter of the piezoelectric element 80. Therefore, the first shaft 81 has a relatively large diameter and the movable portion 2 (optical element holding portion 60) can be engaged with the first shaft 81 with an appropriate frictional force. Thus, the movable portion 2 can be driven with high accuracy in accordance with the movement of the first shaft 81 that moves in the moving direction in accordance with the expansion and contraction of the piezoelectric element 80.

Further, in this embodiment, the taper surface 85a is formed at the end portion of the second shaft 85. Therefore, for example, when the end portion of the second shaft 85 is fixed to the first fixing portion 10 (first small diameter hole 18) or the third fixing portion 50 (third small diameter hole 56) by using a joining member such as an adhesive, a sufficient joint area between the joining member and the end portion of the second shaft 85 can be secured and the end portion of the second shaft 85 can be firmly fixed to the first fixing portion 10 or the third fixing portion 50.

Further, in this embodiment, the length L1 of the holding region 111 of the movable portion 2 held by the first shaft 81 is longer than the length L2 (FIG. 8C) of the support region 112 of the movable portion 2 supported by the second shaft 85. Therefore, the holding region 111 of the movable portion 2 can be engaged with the first shaft 81 with an appropriate frictional force and the movable portion 2 can be driven with high accuracy.

Further, in this embodiment, the support region 112 is located inside both ends of the holding region 111 when viewed from a direction perpendicular to the moving direction of the drive portion 3. Therefore, the movable portion 2 can be held (or supported) in well-balanced manner by two shafts of the first shaft 81 and the second shaft 85 and the movable portion 2 can be driven with high accuracy.

Further, in this embodiment, the fixing portion 4 includes the first fixing portion 10, the second fixing portion 30 supported by the first fixing portion 10, and the third fixing portion 50 supported by the first fixing portion 10 and the second fixing portion 30. Particularly, since the fixing portion 4 is divided into the first fixing portion 10 and the second fixing portion 30, the first fixing portion 10 can be combined with the second fixing portion 30, for example, while the drive portion 3 (the assembly of the piezoelectric element 80, the first shaft 81, and the inertial member 82) is combined with the second fixing portion 30 at the time of assembling the drive portion 3 and the fixing portion 4. In this case, the drive portion 3 (particularly, the piezoelectric element 80 and the inertial member 82) can be easily disposed inside the fixing portion 4 (between the first fixing portion 10 and the second fixing portion 30) and the assembly of the drive portion 3 and the fixing portion 4 is facilitated.

Further, in this embodiment, the upper end portion of the first shaft 81 is fixed to the third fixing portion 50 (third large diameter hole 55) and the lower end portion of the first shaft 81 is fixed to the second fixing portion 30 (second large diameter hole 42). In this case, since the first shaft 81 serves as a column for supporting the third fixing portion 50 by the second fixing portion 30 and the column does not need to be provided in the third fixing portion 50, the configuration of the third fixing portion 50 can be simplified. Further, the first shaft 81 functions as a part of the fixing portion 4 and the third fixing portion 50 can be fixed to the second fixing portion 30 with a sufficient strength through the first shaft 81.

Further, in this embodiment, the upper end portion of the second shaft 85 is fixed to the third fixing portion 50 (third small diameter hole 56) and the lower end portion of the second shaft 85 is fixed to the first fixing portion 10 (first small diameter hole 18). In this case, since the second shaft 85 serves as a column for supporting the third fixing portion 50 by the first fixing portion 10 and the column does not need to be provided in the third fixing portion 50, the configuration of the third fixing portion 50 can be simplified. Further, the third fixing portion 50 can be fixed to the first fixing portion 10 with a sufficient strength through the second shaft 85.

Additionally, the present invention is not limited to the above-described embodiment and can be modified into various forms in the scope of the present invention.

In the above-described embodiment, the first fixing portion 10 is provided with the restricted convex portion 19 and the second fixing portion 30 is provided with the restricted concave portion 44. However, the second fixing portion 30 may be provided with the restricted convex portion 19 and the first fixing portion 10 may be provided with the restricted concave portion 44.

In the above-described embodiment, the lower side of the drive portion 3 is held by the first fixing portion 10 (fixing concave portion 17) and the second fixing portion 30 (second large diameter hole 42), but the lower side of the drive portion 3 may be held only by the second fixing portion 30.

In the above-described embodiment, the arrangement of the position sensor 102 and the sensor magnet 103 may be reversed.

EXPLANATIONS OF LETTERS OR NUMERALS

1 OPTICAL DRIVING DEVICE
2 MOVABLE PORTION
3 DRIVE PORTION
4 FIXING PORTION
10 FIRST FIXING PORTION
19 RESTRICTED CONVEX PORTION
20 RING-SHAPED GROOVE PORTION
21 FIRST HOLDING PORTION
30 SECOND FIXING PORTION
40 RESIN FILLING SPACE
44 RESTRICTED CONCAVE PORTION
45 SECOND HOLDING PORTION
50 THIRD FIXING PORTION
60 OPTICAL ELEMENT HOLDING PORTION
80 PIEZOELECTRIC ELEMENT

81 FIRST SHAFT
82 INERTIAL MEMBER

What is claimed is:

1. An optical driving device comprising:
   a movable portion, an optical element being attachable to the movable portion;
   a drive portion movably holding the movable portion; and
   a fixing portion holding the drive portion,
   wherein each end portion of a first shaft and each portion of a second shaft are fixed to the fixing portion, the first shaft being provided in the drive portion and slidably holding the movable portion, the second shaft provided separately from the drive portion and slidably supporting the movable portion,
   a diameter of the first shaft is larger than a diameter of the second shaft, and
   a distance between fixing positions of the fixing portion, fixing positions fixing both end portions of the first shaft is smaller than a distance between fixing positions of the fixing portion, fixing positions fixing both end portions of the second shaft.

2. The optical driving device according to claim 1, wherein the drive portion includes a piezoelectric element connected to a end portion of the first shaft, and the diameter of the first shaft is larger than a diameter of the piezoelectric element.

3. The optical driving device according to claim 2, wherein the fixing portion includes a first fixing portion, a second fixing portion supported by the first fixing portion, and a third fixing portion supported by the first fixing portion or the second fixing portion.

4. The optical driving device according to claim 3, wherein one end portion of the first shaft is fixed to the third fixing portion and the other end portion of the first shaft is fixed to the second fixing portion.

5. The optical driving device according to claim 1, wherein a end portion of the second shaft is provided with a taper surface.

6. The optical driving device according to claim 1, wherein a length of a holding region of the movable portion held by the first shaft is longer than a length of a support region of the movable portion supported by the second shaft.

7. The optical driving device according to claim 6, wherein the support region is located inside both ends of the holding region when viewed from a direction perpendicular to a moving direction of the drive portion.

8. The optical driving device according to claim 1, wherein the fixing portion includes a first fixing portion, a second fixing portion supported by the first fixing portion, and a third fixing portion supported by the first fixing portion or the second fixing portion.

9. The optical driving device according to claim 8, wherein one end portion of the first shaft is fixed to the third fixing portion and the other end portion of the first shaft is fixed to the second fixing portion.

10. The optical driving device according to claim 9, wherein one end portion of the second shaft is fixed to the third fixing portion and the other end portion of the second shaft is fixed to the first fixing portion.

11. The optical driving device according to claim 8, wherein one end portion of the second shaft is fixed to the third fixing portion and the other end portion of the second shaft is fixed to the first fixing portion.

* * * * *